United States Patent
Su et al.

(10) Patent No.: US 10,071,333 B2
(45) Date of Patent: Sep. 11, 2018

(54) GAS SEPARATION CARTRIDGE

(71) Applicant: Honeywell International Inc., Morristown, NJ (US)

(72) Inventors: Aimin Su, Shanghai (CN); Guohua Lu, Shanghai (CN); Wenpeng Hsueh, San Ramon, CA (US); Huafang Zhou, San Jose, CA (US); Yong Chen, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 685 days.

(21) Appl. No.: 14/508,481

(22) Filed: Oct. 7, 2014

(65) Prior Publication Data
US 2016/0096136 A1 Apr. 7, 2016

(51) Int. Cl.
*B01D 53/02* (2006.01)
*B01D 46/42* (2006.01)
(Continued)

(52) U.S. Cl.
CPC ..... *B01D 46/4227* (2013.01); *B01D 46/0002* (2013.01); *B01D 46/30* (2013.01);
(Continued)

(58) Field of Classification Search
CPC ........ B01D 2253/102; B01D 2257/708; B01D 2258/06; B01D 46/0002; B01D 46/30;
(Continued)

(56) References Cited

U.S. PATENT DOCUMENTS

| | | | | |
|---|---|---|---|---|
| 2,234,499 A | * | 3/1941 | McAllister | G01N 30/62 422/86 |
| 3,187,486 A | * | 6/1965 | Dinelli | G01N 30/16 73/23.39 |

(Continued)

FOREIGN PATENT DOCUMENTS

| CN | 105536439 A | 5/2016 |
|---|---|---|
| EP | 3006098 A1 | 4/2016 |

(Continued)

OTHER PUBLICATIONS

Europe Patent Application No. 15188272.7, Extended European Search Report, dated Feb. 12, 2016, 8 pages.
(Continued)

*Primary Examiner* — Christopher P Jones
(74) *Attorney, Agent, or Firm* — Wick Phillips Gould & Martin LLP

(57) ABSTRACT

A gas separation cartridge including a housing comprising an inlet port for an air sample to enter; a top cover attached to the housing; an upper cavity comprising individual chambers comprised of a chemical or an absorbent or a mixture thereof attached to the top cover wherein each end of each chamber has an opening; a bottom cover attached to the upper cavity, wherein the bottom cover comprises a lower cavity, a separate opening for an air sample traveling from an individual chamber to pass through, and a separate opening for an air sample that does not pass through an individual chamber; and a base upon which the bottom cover of the cartridge is seated, wherein the base has an exit port.

20 Claims, 9 Drawing Sheets

(51) Int. Cl.
*B01D 53/14* (2006.01)
*B01D 53/18* (2006.01)
*B01D 53/04* (2006.01)
*B01D 46/00* (2006.01)
*B01D 46/30* (2006.01)
*B01D 53/82* (2006.01)

(52) U.S. Cl.
CPC ......... *B01D 53/04* (2013.01); *B01D 53/0415* (2013.01); *B01D 53/145* (2013.01); *B01D 53/18* (2013.01); *B01D 53/82* (2013.01); *B01D 2253/102* (2013.01); *B01D 2257/708* (2013.01); *B01D 2258/06* (2013.01)

(58) Field of Classification Search
CPC ............... B01D 46/4227; B01D 53/04; B01D 53/0415; B01D 53/145; B01D 53/18; B01D 53/82
See application file for complete search history.

(56) References Cited

U.S. PATENT DOCUMENTS

| | | | | |
|---|---|---|---|---|
| 3,257,781 A | * | 6/1966 | Debbrecht | G01N 30/38 96/105 |
| 4,971,611 A | * | 11/1990 | Noguchi | B01D 53/06 96/123 |
| 5,092,155 A | * | 3/1992 | Rounbehler | G01N 1/02 436/156 |
| 6,183,703 B1 | * | 2/2001 | Hsu | B01D 53/864 422/198 |
| 9,658,196 B2 | * | 5/2017 | Chou | G01N 30/06 |
| 2003/0194362 A1 | * | 10/2003 | Rogers | C01B 3/323 422/222 |
| 2005/0092176 A1 | * | 5/2005 | Ding | B01D 53/02 95/90 |

FOREIGN PATENT DOCUMENTS

| | | |
|---|---|---|
| WO | 2005087360 A1 | 9/2005 |
| WO | 2005106221 A1 | 11/2005 |

OTHER PUBLICATIONS

Europe Patent Application No. 15188272.7, Examination Report, dated May 16, 2017, 4 pages.
Europe Patent Application No. 15188272.7, Communication pursuant to Article 94(3) EPC, dated Nov. 7, 2017, 5 pages.

* cited by examiner

GAS SEPARATION CARTRIDGE

FIELD

The application pertains to a gas separation cartridge. More particularly, the application pertains to a gas separation cartridge that includes multiple gas separation passages comprising individual tubes or individual chambers.

BACKGROUND

Gas sensors are used in many commercial and industrial applications, including monitoring the environment for the presence of toxic or hazardous gases. It is frequently necessary to detect the concentration of a gas species at a level of a few parts per million. Since this gas species may be present at a low level, there is a need to remove or separate other extraneous gases or volatile organic compounds that would likewise be detected at the sensor and interfere with the detection of the gas species of interest.

In some sensors, high surface area carbon is used to adsorb extraneous volatile organic gas species. Other absorbents and chemicals may be utilized depending upon the species to be removed. Usually these absorbents and chemicals are supplied in a sealed glass tube, which must be broken so that the air sample can flow through. Such gas separation tubes are normally attached to the inlet of a gas sensor.

Usually, gas separation tubes are manually installed, one-at-a-time, onto a gas sensor. This is a time-consuming, and potentially dangerous process. First, a glass tube must be manually attached to the inlet of the gas sensor. Next, the ends or tips of the glass tube must be manually broken so that air can flow through the tube. Thereafter, the air sample is taken. Subsequently, the spent glass tube having broken glass tips must be manually removed from the gas sensor and disposed of. Afterwards, the glass shards from the broken glass tips must be collected and discarded. The art therefore continues to seek improvements in gas separation tube technology.

The current gas separation cartridge comprises multiple gas separation passages within one container, which passages are easily accessible by simply rotating the cartridge. A passage can be an individual tube or an individual chamber having an opening at both ends so that air can pass through on its way to the gas sensor. The passages are physically separated from each other by a gas impermeable, inert barrier.

There is only one installation of the cartridge, which permits access to multiple tubes, which is a time saver. Not only that, there is less interruption of air sampling. Similarly, there is just one removal of the cartridge. In addition, there is a decreased safety risk because there is no need to manually handle a tube having broken glass tips. Likewise, there is no need to clean up the broken glass shards. Here, the tube and glass shards remain contained within the cartridge. The cartridge is rotatable in order to access each individual passage. Thus, this current cartridge leads to improved operation and safety in gas sensor usage.

BRIEF DESCRIPTION OF THE DRAWINGS

FIG. 5 is a view of a gas separation cartridge having individual chambers for the sampled air to travel through.

DETAILED DESCRIPTION

Figure 1:
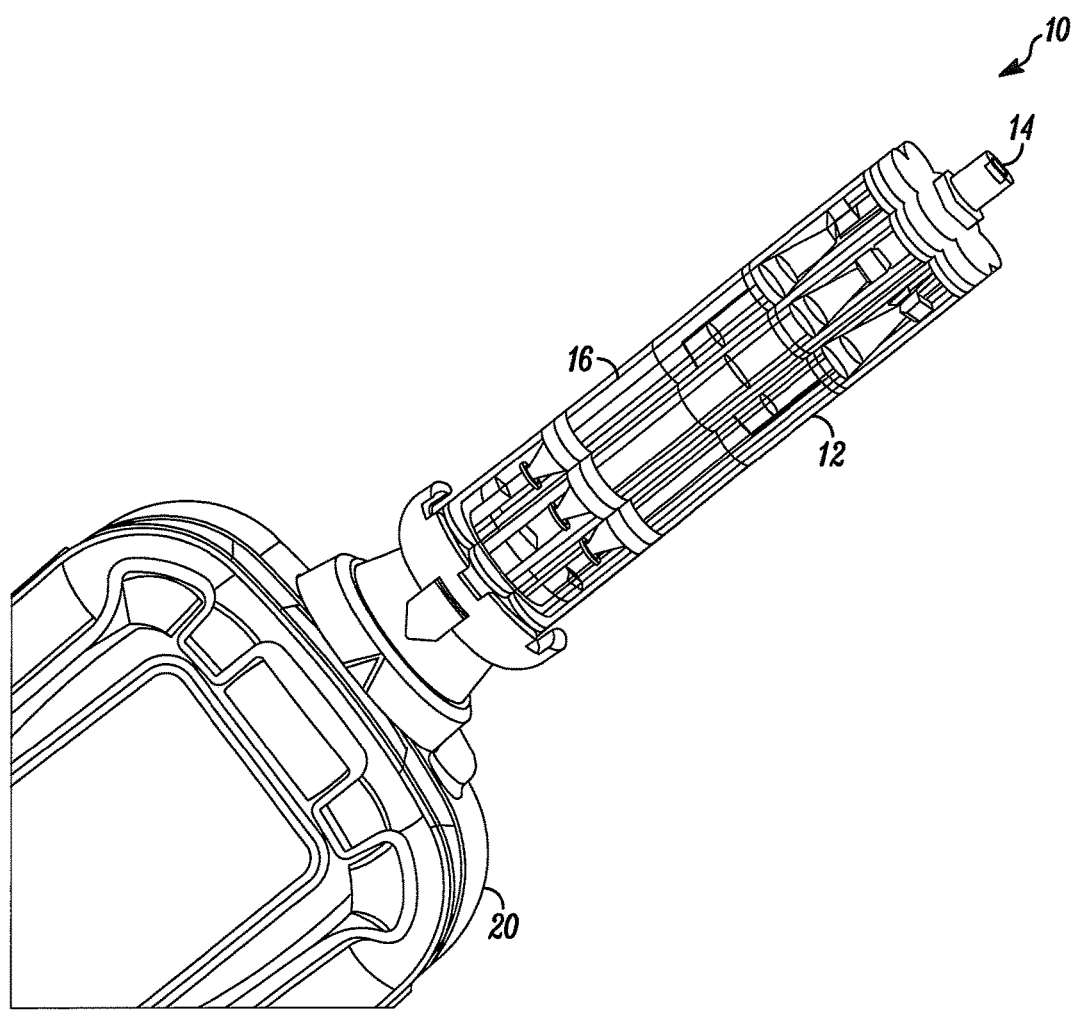
FIG. 1 is a view of a gas separation tube cartridge attached to a gas sensor.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

A gas separation cartridge that is attachable to a gas sensor is described herein. This cartridge includes a housing containing multiple passages comprising individual tubes or individual chambers or mixtures thereof. Each passage can contain a chemical or an absorbent to remove extraneous species from the air sample, such as volatile organic gases, so that only the gas species of interest remains in the air sample. This cartridge decreases interference from signals that would otherwise appear due to the presence of other chemicals in the air. For example, if the level of benzene in ambient air is to be monitored, the tubes or chambers would contain adsorbents or chemicals that remove most everything from the air sample except for benzene. The resulting air sample containing primarily benzene then would be analyzed by the attached gas sensor.

After the first air sample is analyzed, the cartridge could be rotated so that another unused passage is available for a second air sample, and so on. The passages may or may not contain the same absorbents or chemicals. The only limitation as to how many passages per cartridge depends on the size of the passage needed and the efficiency of the chemicals within. After all of the passages have been used, the cartridge can be replaced with another.

FIG. 1 illustrates one type of gas separation cartridge 10 connected to a gas sensor 20 in accordance herewith. It will be understood that neither the exact shape, nor the exact configuration of the cartridge 10, except to the extent described below, are limitations hereof. In the Figure, the cartridge 10 has a cylindrical shape. The cartridge 10 includes a housing 12, which is formed of a relatively inert, gas impervious material. The housing 12 can be made of glass, ceramic, acrylonitrile butadiene styrene, polyethylene, polypropylene, polyvinylchloride, respective derivatives thereof or mixtures thereof. When the housing is made of a transparent material, the passages inside can easily be visualized.

Within the housing 12 is an opening 14, through which a gas sample enters the housing 12. The housing 12 also contains a second opening (not shown) at the opposite end of the housing for gas to exit. The gas, after entering, travels through the housing 12 to a gas separation tube 16 that removes substantially all other gas species besides the one of interest. The gas separation tube 16 is formed of glass or other substantially inert material and can have any shape that allows air to flow through from one end to another. A cylindrical shape is illustrated. There can be multiple tubes 16 within the housing 12. Optionally, a filter (not shown) can be attached to the opening 14 of the gas separation tube 16 in order to reduce particulate matter in the air sample.

Figure 2:
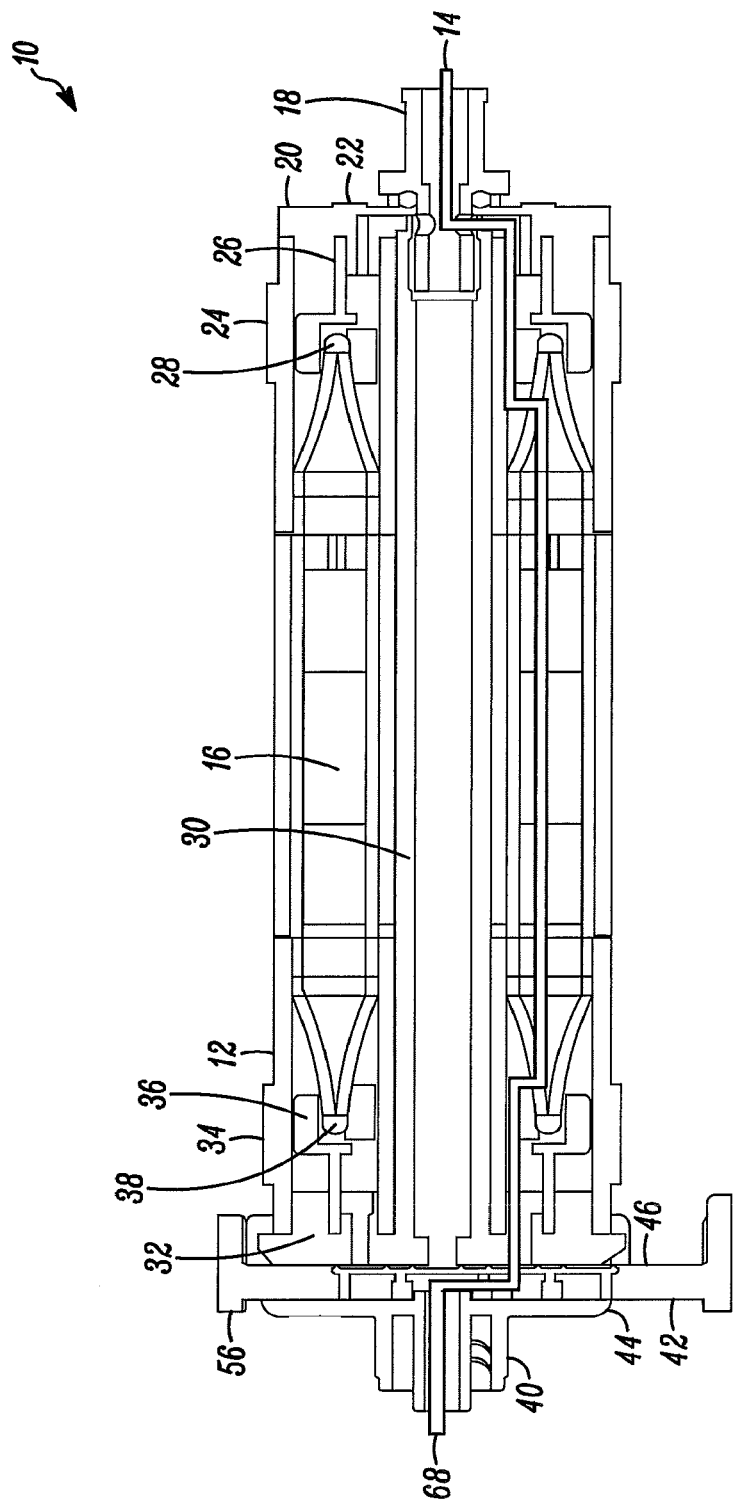
FIG. 2 is a view of a gas separation tube cartridge.

FIG. 2 illustrates another view of a gas separation cartridge 10 having a housing 12 and an inlet port 18 including an opening 14. The inlet port 18 is attached to an upper lid 20. The upper lid 20 contains separate openings 22 for each air sample to travel without cross-contamination from other air samples or ambient air. The number of openings 22 can correlate with the number of tubes 16 present; however, there can be additional openings for air samples that will not be passed through a tube 16 to travel without having to remove the cartridge 10. These additional openings are attached to a separate cavity 30 within the housing 12, which is attached to the gas detector. On the outside of the housing 12, there is a tab 24 connected to a lever 26, which touches the glass separation tube 16. The tab 24 and lever 26 work together so that the user can press the tab 24 to activate the lever, which will break one glass tip 28 of the gas separation tube 16. There is a corresponding tab 34 on the opposite end of the housing 12 connected to a second lever 36 that the user can press to break the second glass tip 38 of the gas separation tube 16 in a similar fashion.

Once these tips 28, 38 are broken, the air sample can pass through the tube 16 so that extraneous gases are removed. The air sample will travel through a lower lid 32 that contains separate openings 56 for each tube 16 and additional openings for the non-treated air samples to exit from the cartridge 10 and eventually enter the gas sensor.

There is a tube selection component 40 that connects the cartridge 10 to the gas sensor. The tube selection component 40 can rotate to allow use of another tube 16 after the existing tube is spent or otherwise inoperative. The tube selection component 40 has a switch 42 attached to the lower lid 32, which switch 42 contains multiple openings 44 and passages 46 for each air sample to separately flow through to the gas sensor.

Thus the air sample can travel into the inlet port 18 through an opening 14 in the upper lid 20 into and through a gas separation tube 16, then through an opening in the lower lid 32 into a switch 42 that leads to the gas sensor. Alternatively, the air sample can travel into the inlet port 18 through an opening 14 in the upper lid 20, then through a cavity 30, followed by an opening in the lower lid 32 into a switch 42 that leads to the gas sensor.

Figure 3:
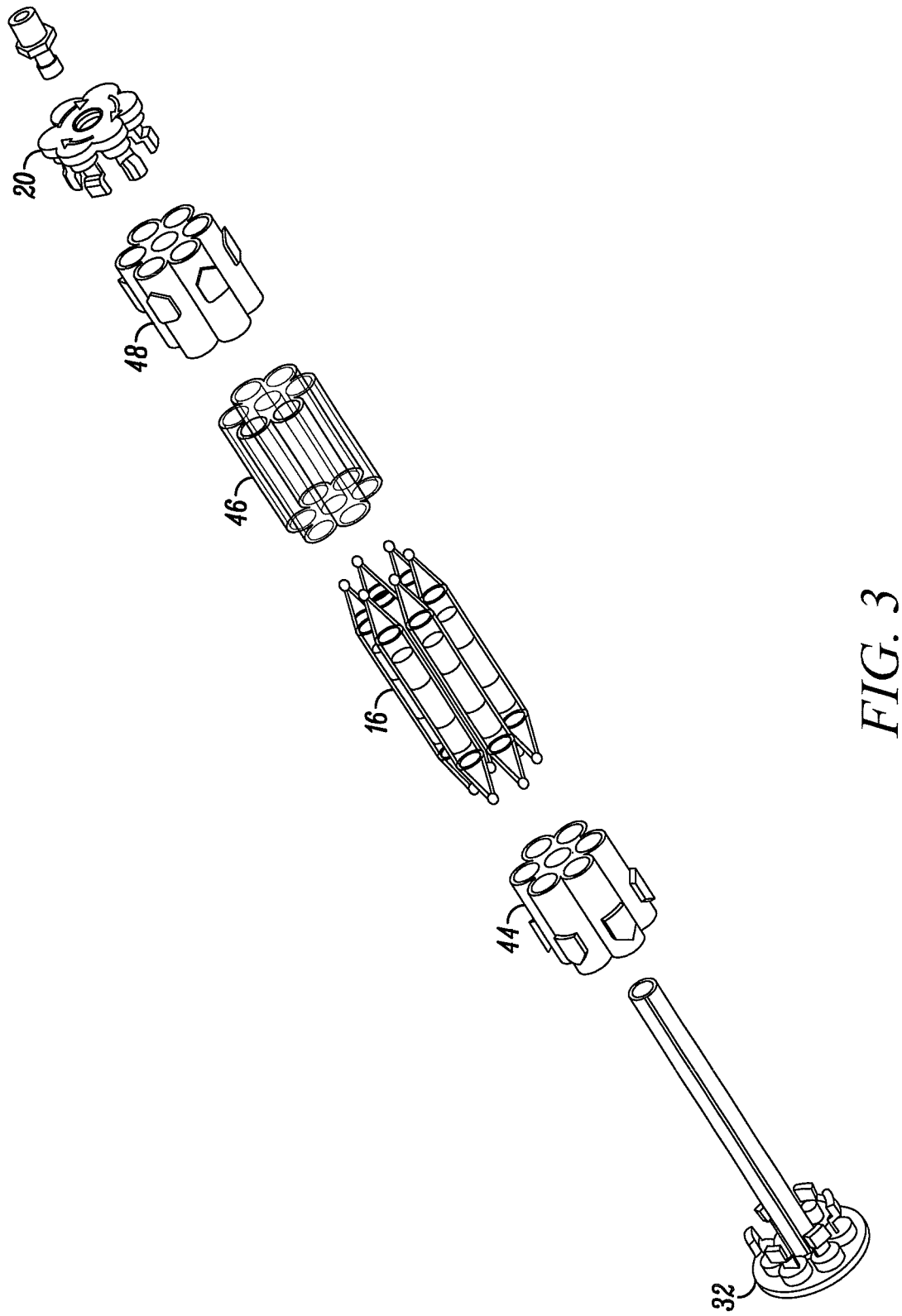
FIG. 3 is an exploded view of a gas separation tube cartridge.

FIG. 3 illustrates an exploded view of a gas separation cartridge 10. The air sample enters the cartridge 10 at an inlet port 18, which is attached to an upper lid 20. A first sealing element 48 is attached to the upper lid 20. A support stand 46 is attached to the first sealing element 48. The support stand 46 is attached to a second sealing element 44 at the other end of the cartridge 10. The lower lid 32 is attached to the second sealing element 44. The lower lid 32 is attached to the second sealing element and contains an exit port (not shown) for the air sample to exit the cartridge. Gas separation tubes 16 can be attached to the support stand 46 that holds and protects the gas separation tubes 16. There is a cavity (not shown) attached to the inlet port that non-treated air can pass through to the gas sensor.

Figure 4:
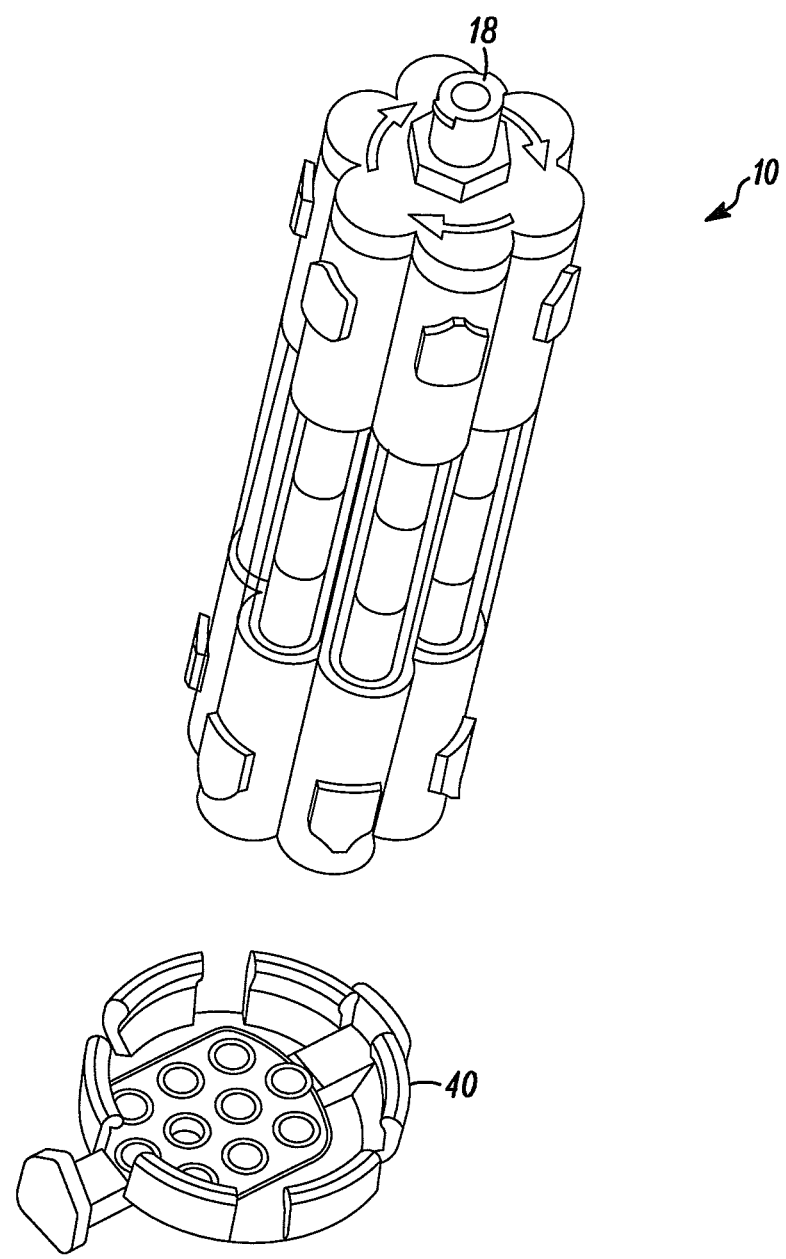
FIG. 4 is a view of a gas separation tube cartridge and tube selection part.

FIG. 4 illustrates another view of a gas separation cartridge 10. The inlet port 18 can be seen at one end and at the other, the tube selection component 40 and switch 42. The components of the cartridge 10 can pre-assembled before use. The cartridge 10 is easily connected to the inlet of a gas detector with or without a vacuum pump to pull air though.

There can be one or more guides on the housing (not shown) so that the user can align the desired tube into proper position by rotation of the cartridge. The tubes can optionally contain a sensor that indicates when the absorbents or chemicals in the tube are nearly spent so that the user can switch to a different tube. The sensor can be a color change that is directly observable by the user or any other convenient indicator.

Figure 5:
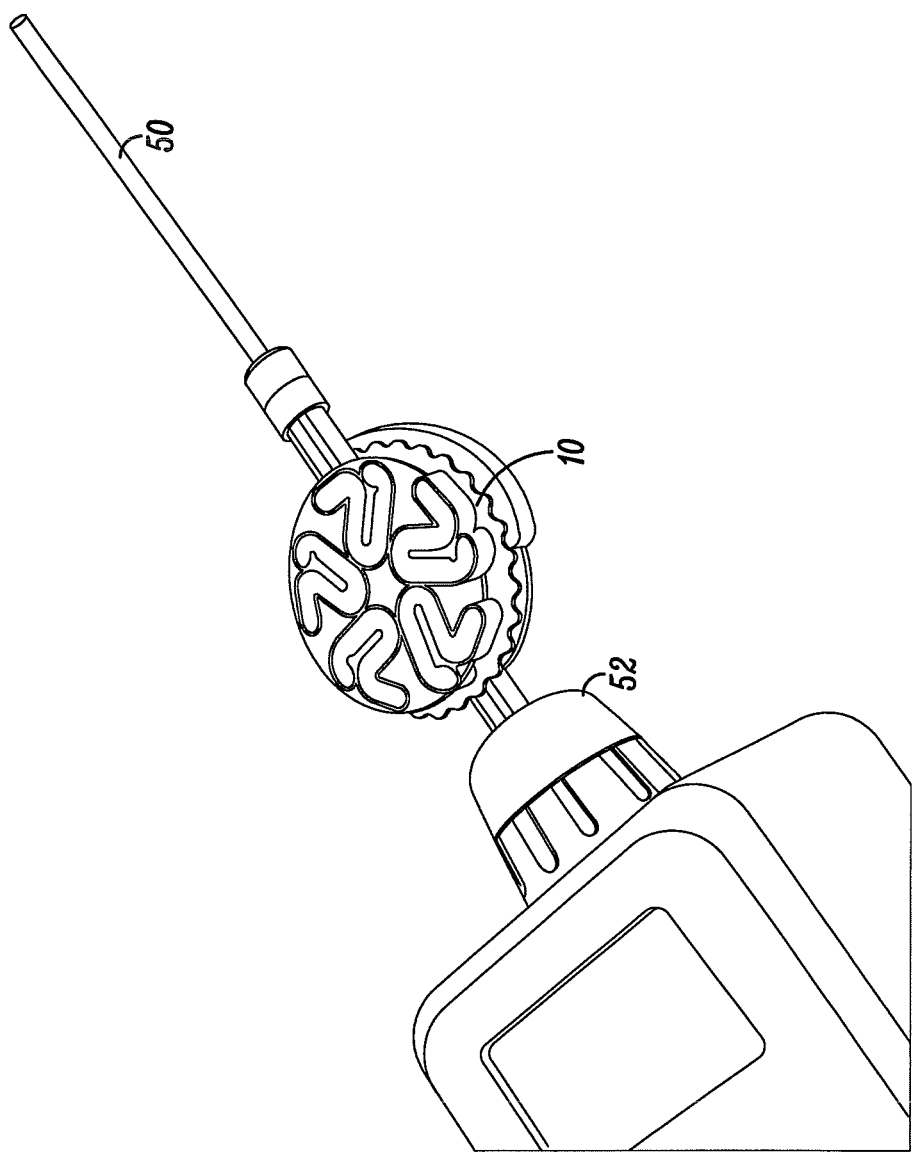

FIG. 5 illustrates another embodiment of a gas separation cartridge 10. Instead of individual glass tubes, the cartridge 10 has individual chambers for the air sample to pass through so the extraneous gas species can be removed. The individual chambers are physically separated by a gas impermeable, inert barrier. The cartridge in this embodiment is rotatable in order to access each chamber. The cartridge can optionally have an extension 50 for sampling air from hard to access spaces. At the opposite end, the cartridge can have a stem 52 for attaching to the gas sensor.

Figure 6:
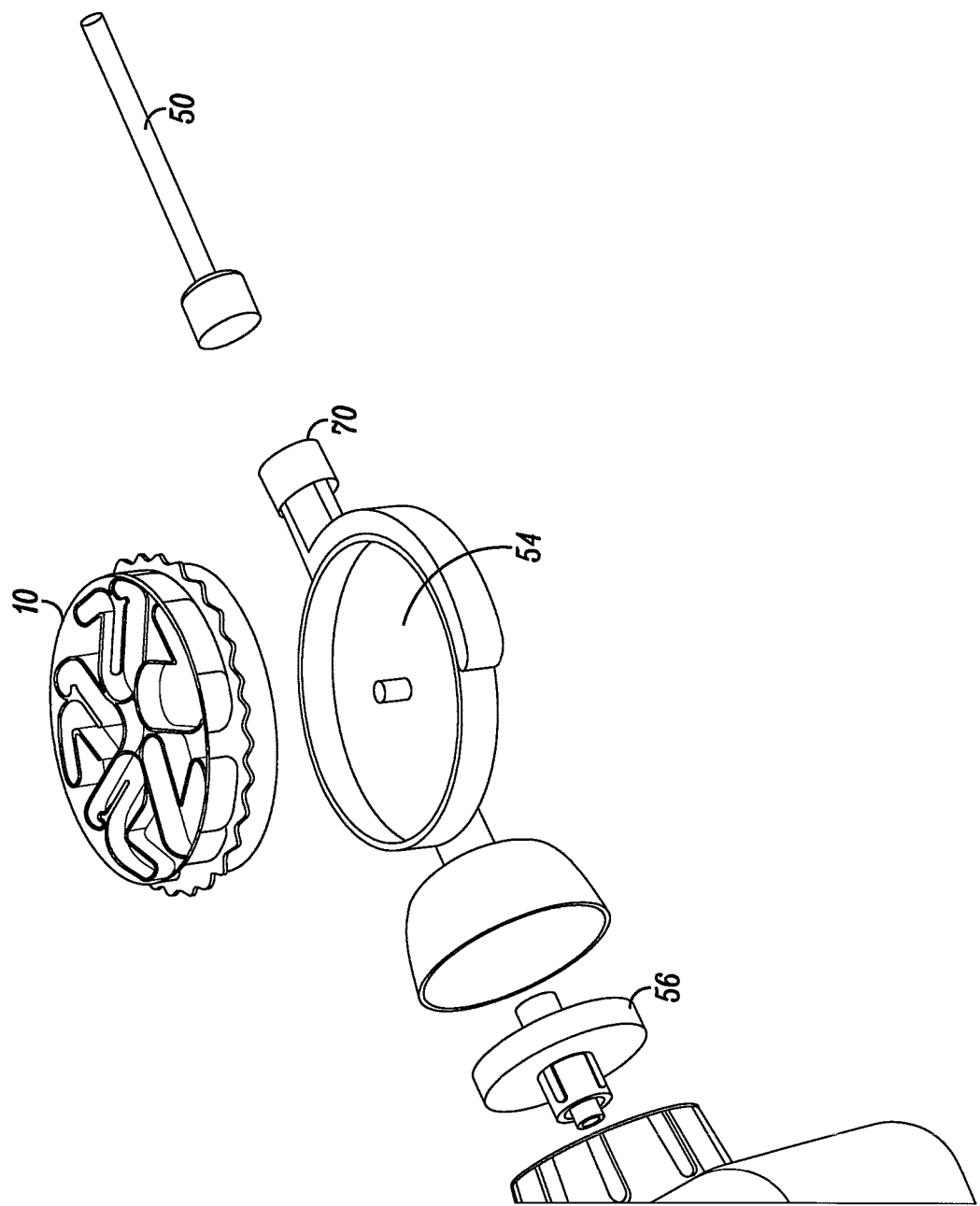
FIG. 6 is an exploded view of a gas separation chamber cartridge.

FIG. 6 illustrates another view of a gas separation cartridge 10 having individual chambers for the air sample to pass through. Also shown is a base having a snap feature 54, which the cartridge is attached. The base also has an exit port for the gas to travel from the cartridge into the detector. A filter can optionally be installed at the inlet of the gas sensor, as indicated.

Figure 7:
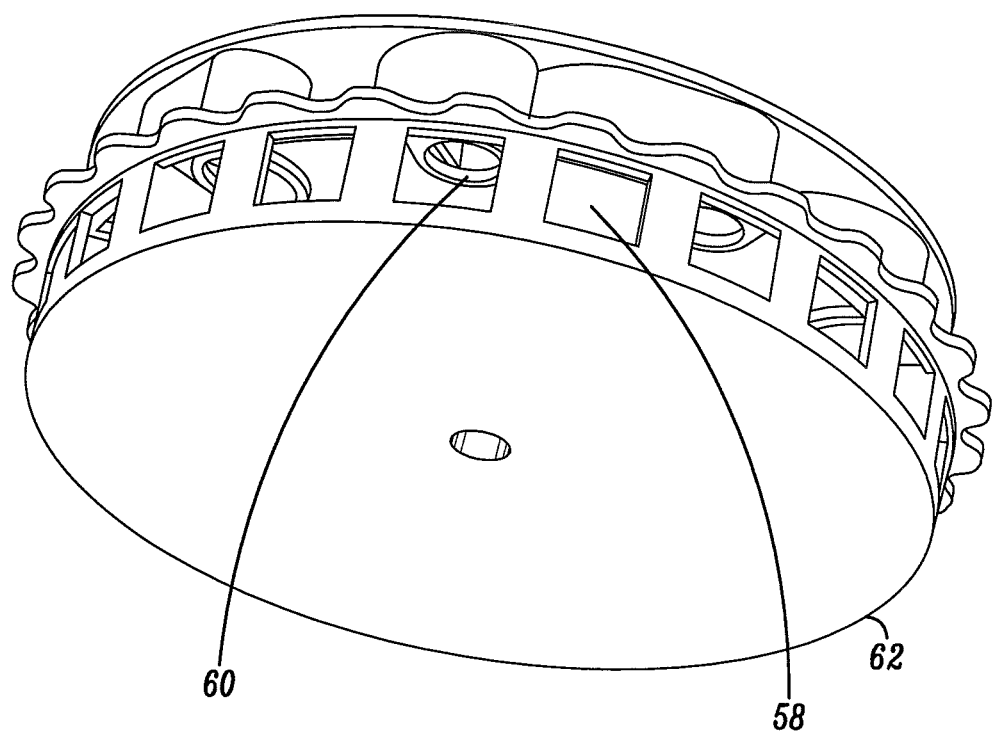
FIG. 7 is an enlarged view of one side of a gas separation chamber cartridge.

FIG. 7 illustrates a close-up view of a gas separation cartridge 10 having individual chambers for the air sample to pass through. Here there are two types of openings 58 and 60 that can be seen in the lower lid 62. The opening for the non-treated air sample to pass through is 58 and the other opening 60 is for the air sample that will go through a gas separation chamber.

Figure 8:
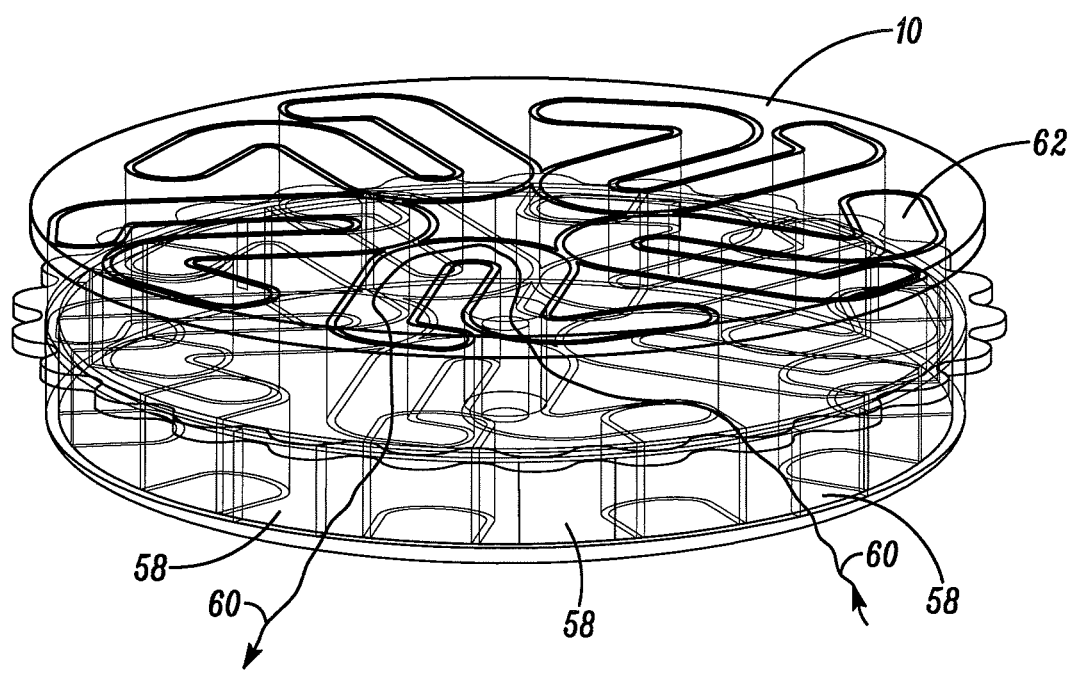
FIG. 8 is an enlarged view of the top of a gas separation chamber cartridge.

FIG. 8 is another view of a gas separation cartridge 10 having individual chambers 62 for the air sample to pass through. Each chamber has an opening at both ends of the chamber. This view more clearly illustrates the opening 58 for air sample to pass through without passing through a gas separation chamber 62 and the opening 60 for the air sample to pass through a gas separation chamber 62.

Figure 9:
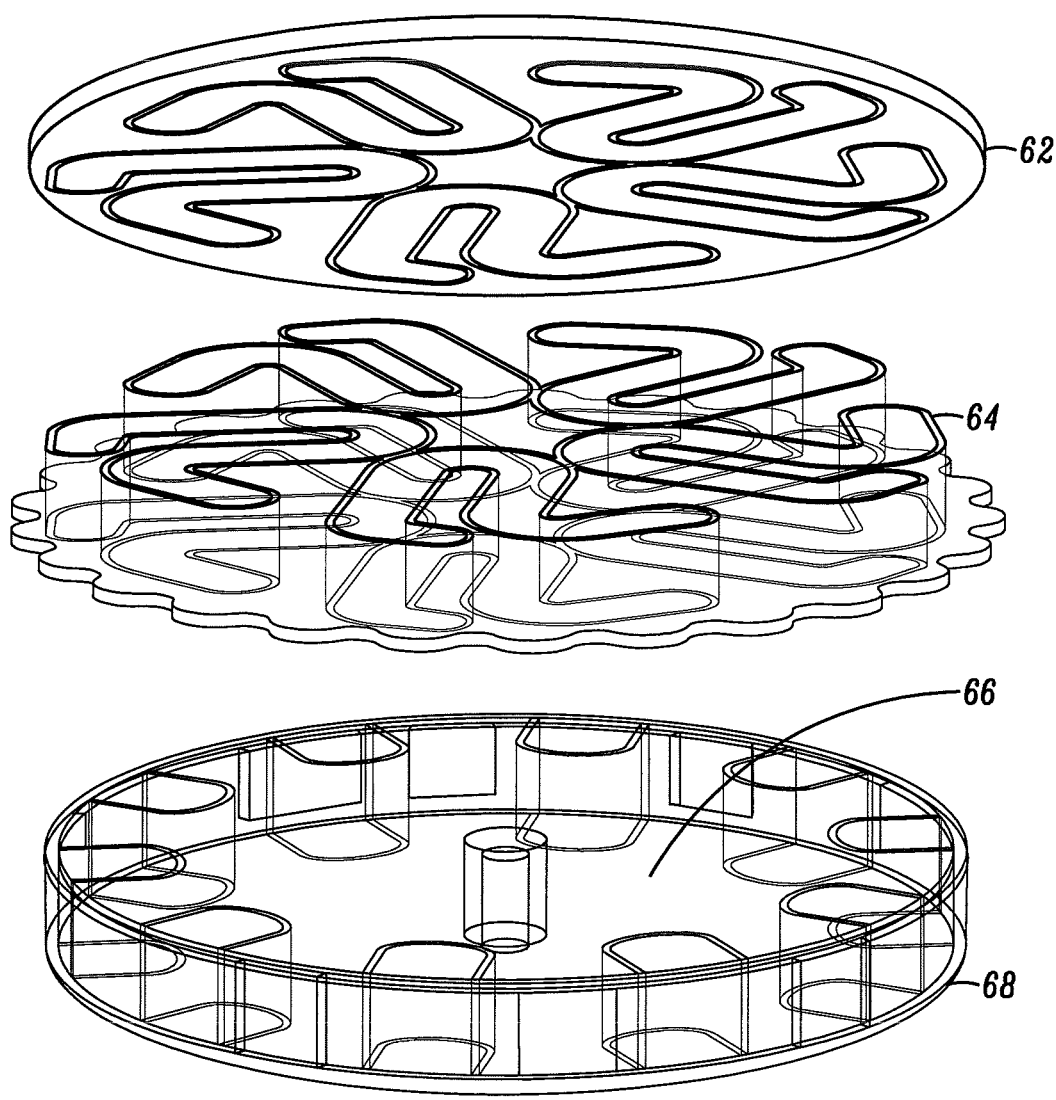
FIG. 9 is an exploded enlarged view of a gas separation chamber cartridge.

FIG. 9 is another view of a gas separation cartridge 10. This view illustrates that the cartridge 10 can be comprised of a top cover 62, an upper cavity 64 comprising multiple chambers having an opening at each end of each chamber, and a bottom cover 68 having a lower cavity 66. The openings for each chamber matches up with an opening in the bottom cover so that there is a separate entrance point and exit point for air travelling through each chamber.

In this embodiment, the air sample enters the cartridge through an inlet port which optionally can be connected to an extension, which can reach otherwise inaccessible spaces. After entering the inlet port, the air can be treated or not treated depending upon which opening the user chooses. For not-treated air, the air travels directly from the inlet to an opening in the bottom lid through the lower cavity then out an opening in the bottom lid, which leads to the exit port into the gas sensor.

Alternatively, the air can travel from the inlet port into an opening in the bottom cover to a chamber that contains a chemical or absorbent to remove gas species other than the one of interest. The air sample can travel from one end of the chamber through the length of the chamber to a separate opening at the other end of the chamber, which is attached to a separate opening in the bottom cover. From there, the treated air sample can exit through the exit port into the gas sensor.

One benefit of this cartridge is that many individual gas separation tubes are contained within one cartridge that only has to be attached and removed once, which is a significant time-saver. Additionally, there is no significant interruption of air sampling because a new tube can be accessed very quickly. The tubes are easily accessible by merely rotating the cartridge. Moreover, the use of this cartridge is much safer than others because the glass tubes are contained within the housing and their tips are to be broken within the housing. This means no glass shards are shattered in the environment. Furthermore, there are no shards to be cleaned up or broken glass tubes to manually handle.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A gas separation cartridge comprising a housing containing multiple individual passages, which are physically separated by a gas impermeable, inert barrier;
    an inlet port configured to receive an air sample in the housing;
    an exit port configured to pass air out of the housing;
    wherein each passage comprises a chemical or an absorbent or a mixture thereof, wherein the chemical, the absorbent, or the mixture thereof is configured to remove one or more species from the air sample;
    two tabs on the outside surface of the housing, each tab residing near a tip of a gas separation tube, which tabs are each connected to an individual lever inside the cartridge, which individual levers are located near the tips of the gas separation tube;
    wherein the housing is configured to provide a selective flow path through the inlet port, through one of the multiple individual passages, and out through the exit port;
    wherein each end of each passage is sealed.

2. The gas separation cartridge of claim 1, wherein the shape of the cartridge is cylindrical.

3. The gas separation cartridge of claim 1, wherein the housing comprises a solid material selected from the group consisting of glass, ceramic, acrylonitrile butadiene styrene, polyethylene, polypropylene, polyvinylchloride, derivatives thereof, and mixtures thereof.

4. The gas separation cartridge of claim 1, further comprising a selection component configured to rotate and allow selection of a passage from the multiple individual passages.

5. The gas separation cartridge of claim 1, wherein the chemical comprises carbon.

6. The gas separation cartridge of claim 1, wherein the multiple individual passages comprise individual tubes or individual chambers.

7. The gas separation cartridge of claim 6, wherein the individual tubes comprise glass.

8. The gas separation cartridge of claim 6, wherein the individual tubes comprise a cylindrical shape.

9. The gas separation cartridge of claim 1, further comprising a filter to remove particulate matter.

10. The gas separation cartridge of claim 1, wherein the housing comprises:
    a) an inlet port for an air sample to enter;
    b) an upper lid attached to the inlet port;
    c) a first sealing element attached to the upper lid;
    d) a tube support stand attached to the first sealing element;
    e) a second sealing element attached to the tube support stand; and
    f) a lower lid attached to a second sealing element wherein the lower lid comprises an exit port.

11. The gas separation cartridge of claim 10, further comprising at least one gas separation tube attached to the tube support stand and to the inlet port.

12. The gas separation cartridge of claim 11, wherein the at least one gas separation tube comprises glass.

13. The gas separation cartridge of claim 10, comprising a cavity attached to the inlet port through which a non-treated air sample can travel to a gas sensor.

14. The gas separation cartridge of claim 10, further comprising an extension configured to sample air.

15. The gas separation cartridge of claim 10, wherein the lower lid is attached to a switch containing multiple openings and passages for the air sample to separately flow through to the gas sensor.

16. The gas separation cartridge of claim 10, wherein a switch is connected to a tube selection component, which is rotatable.

17. The gas separation cartridge of claim 1, wherein
    the housing comprises an inlet port for an air sample to enter; wherein the gas separation cartridge further comprises:
    a top cover attached to the housing;
    an upper cavity, wherein the multiple individual passages comprise individual chambers attached to the top cover, wherein each end of each individual chamber has an opening;
    a bottom cover attached to the upper cavity, wherein the bottom cover comprises a lower cavity, a separate opening for an air sample traveling from an individual chamber to pass through, and a separate opening for an air sample that does not pass through an individual chamber to pass through; and
    a base upon which the bottom cover of the cartridge is seated, wherein the base comprises an exit port.

18. The gas separation cartridge of claim 17, wherein the housing comprises a solid material selected from the group consisting of glass, ceramic, acrylonitrile butadiene styrene, polyethylene, polypropylene, polyvinylchloride, derivatives thereof, and mixtures thereof.

19. The gas separation cartridge of claim 17, wherein the multiple individual chambers comprise a chemical or an absorbent or a mixture thereof.

20. The gas separation cartridge of claim 19, wherein the chemical comprises carbon.

* * * * *